US011979438B2

(12) United States Patent
Ren et al.

(10) Patent No.: US 11,979,438 B2
(45) Date of Patent: May 7, 2024

(54) INTEGRATED VIDEO CONFERENCING PLATFORM

(71) Applicant: Citrix Systems, Inc., Fort Lauderdale, FL (US)

(72) Inventors: Mingming Ren, Nanjing (CN); Yajun Yao, Nanjing (CN); Zhaohui Mei, Nanjing (CN); Yuan Bai, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 128 days.

(21) Appl. No.: 17/537,601

(22) Filed: Nov. 30, 2021

(65) Prior Publication Data
US 2023/0147216 A1    May 11, 2023

Related U.S. Application Data

(63) Continuation of application No. PCT/CN2021/129544, filed on Nov. 9, 2021.

(51) Int. Cl.
| H04L 29/06 | (2006.01) |
| G06F 9/451 | (2018.01) |
| H04L 12/18 | (2006.01) |
| H04L 65/1083 | (2022.01) |
| H04N 7/15 | (2006.01) |

(52) U.S. Cl.
CPC .......... *H04L 65/1083* (2013.01); *G06F 9/452* (2018.02); *H04L 12/1822* (2013.01); *H04N 7/15* (2013.01)

(58) Field of Classification Search
CPC ............. H04L 65/1083; H04L 12/1822; H04L 12/1818; H04L 65/1093; H04L 12/1827; H04L 65/403; G06F 9/452; H04N 7/15; H04N 7/147
See application file for complete search history.

(56) References Cited

U.S. PATENT DOCUMENTS

| 11,562,657 B1 * | 1/2023 | Fieldman ................. G09B 5/14 |
| 2011/0090898 A1 * | 4/2011 | Patel ...................... H04L 12/66 |
| | | 370/352 |

* cited by examiner

*Primary Examiner* — Kim T Nguyen (57) ABSTRACT

Methods and systems for multi-application video conferencing are described herein. A computing device may establish a communications session with a user computing device, then establish a group video call session with a group video call application. The computing device may provide, to the user computing device, video output associated with the group video call session. The computing device may receive, from the user computing device, input (e.g., video, audio, commands). The computing device may convert, based on an identity of the group video call application, the input into a format compatible with the group video call application. The computing device may then provide, to the group video call application, the converted input.

20 Claims, 6 Drawing Sheets

INTEGRATED VIDEO CONFERENCING PLATFORM

CROSS-REFERENCE TO RELATED APPLICATIONS

This application claims priority to Chinese Application No. PCT/CN2021/129544, entitled Integrated Video Conferencing Platform, filed Nov. 9, 2021.

FIELD

Aspects described herein generally relate to computer networking, remote computer access, virtualization, video conferencing, and hardware and software related thereto. More specifically, one or more aspects describe herein provide for a way to permit users to use group video call applications remotely and via a common client.

BACKGROUND

The COVID-19 pandemic has made videoconferencing more important than ever. Group video call applications, such as the Zoom Cloud Meetings program developed by Zoom Video Communications of San Jose, Calif., and the Microsoft Teams program developed by Microsoft Corporation of Redmond, Wash. (among others), allow two or more users to share video (e.g., webcam video, screen content), audio (e.g., microphone audio, music, computer audio), text content (e.g., chat content), and the like. For example, employees of an organization may join a group video call session using one of the aforementioned group video call applications to talk about work, share files, and the like. Group video call applications generally are not interoperable, such that users of one group video call applications generally cannot access a group video call session created using another group video call application.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards permitting users to use one or more group video call applications remotely and via a common client.

As will be described in more detail herein, a computing device may establish a first communications session with a user computing device. The computing device may establish, via a group video call application, a group video call session. As part of establishing that group video call session, the computing device may execute, in a remote desktop environment, the group video call application. The computing device may provide, to the user computing device and via the first communications session, video output associated with the group video call session. The computing device may receive, from the user computing device and via the first communications session, a command configured to interact with a second group video call application different from the group video call application. That command may correspond to one or more of: inviting a user to the group video call session; muting audio in the group video call session; and/or interacting with a text chat associated with the group video call session. The command may be received via a second group video call application (e.g., a generic meeting client) executing on the user computing device. The computing device may convert, based on an identity of the group video call application, the command into a format compatible with the group video call application. The computing device may provide, to the group video call application, the converted command.

The computing device may receive various forms of input from the user computing device and translate it for one or more video call sessions. For example, the computing device may receive, via a camera of the user computing device, video and/or data. That video and/or audio data may be received from a camera (e.g., a webcam) of the user computing device, a microphone of the user computing device, a screen of the user computing device (e.g., as part of sharing the screen of the user computing device), or the like. The computing device may convert, based on the identity, the video and/or audio data into a format compliant with the group video call application. The computing device may then provide, to the group video call application, the converted video and/or audio data.

The computing device may translate the commands received by emulating use of a group video call application. For example, the computing device may determine one or more mouse movements corresponding to a command. In such a circumstance, the computing device may provide the converted command by emulating the one or more mouse movements.

As will be described in greater detail below, one advantage of the present disclosure is that it may allow for one or more users to participate in one or more group video call sessions, in effect without regard to the group video call application used to establish those group video call sessions. For example, the computing device may provide, to a second user computing device, second video output associated with the group video call session. The computing device may receive, from the second user computing device, a second command configured to interact with a second group video call application different from the group video call application. Then, the computing device may convert, based on an identity of the group video call application, the second command into a format compatible with the group video call application. The computing device may then provide, to the group video call application, the converted second command.

Establishing a group video call session may comprise various processing steps on the part of the computing device. For example, the computing device may receive, from the user computing device, authentication credentials, and then establish the group video call session by providing, to the group video call application, the authentication credentials. The computing device may additionally and/or alternatively emulate a location of the user computing device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards allowing a user computing device to participate in group video call sessions regardless of which group video call applications are used, and in a manner which permits the user computing device to join multiple group video call sessions at once. Group video call applications, such as the Zoom Cloud Meetings program developed by Zoom Video Communications of San Jose, Calif., and the Microsoft Teams program developed by Microsoft Corporation of Redmond, Wash., have become more important than ever, particularly given the COVID-19 pandemic. That said, because many different group video call applications exist, users can quickly become frustrated at the possibility of having to hop between different group video call applications throughout the day. Moreover, because some organizations implement network security policies that prevent the use of certain group video call applications, some users might not be able to use a particular group video call application.

Aspects described herein remedy these and other problems by using a remote server to remotely implement a variety of different video call applications. A user computing device may, using a generic meeting client, connect to a remote computing device. That remote computing device may be configured to translate input (e.g., commands, audio, video) from that generic meeting client into a format appropriate for any desired group video call application. In turn, that remote server may remotely execute one or more group video call applications and, using the translated input, participate in group video call sessions on behalf of the user computing device. The remote server may then provide, back to the user computing device, output from the group video call sessions. In this way, the user computing device can effectively (and safely) participate in any group video call session desired regardless of which group video call application is used. Indeed, the user computing device may participate in a plurality of different group video call sessions at the same time.

Aspects described herein improve the functioning of computers by improving the manner in which computer-implemented group video call applications are executed and used. The problems addressed by the present disclosure are fundamentally rooted in computing devices, and more particularly in the manner in which group computing devices participate in and/or otherwise access group video call sessions. The processes described herein could not be performed by a human being, whether mentally, with pen-and-paper, or otherwise.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
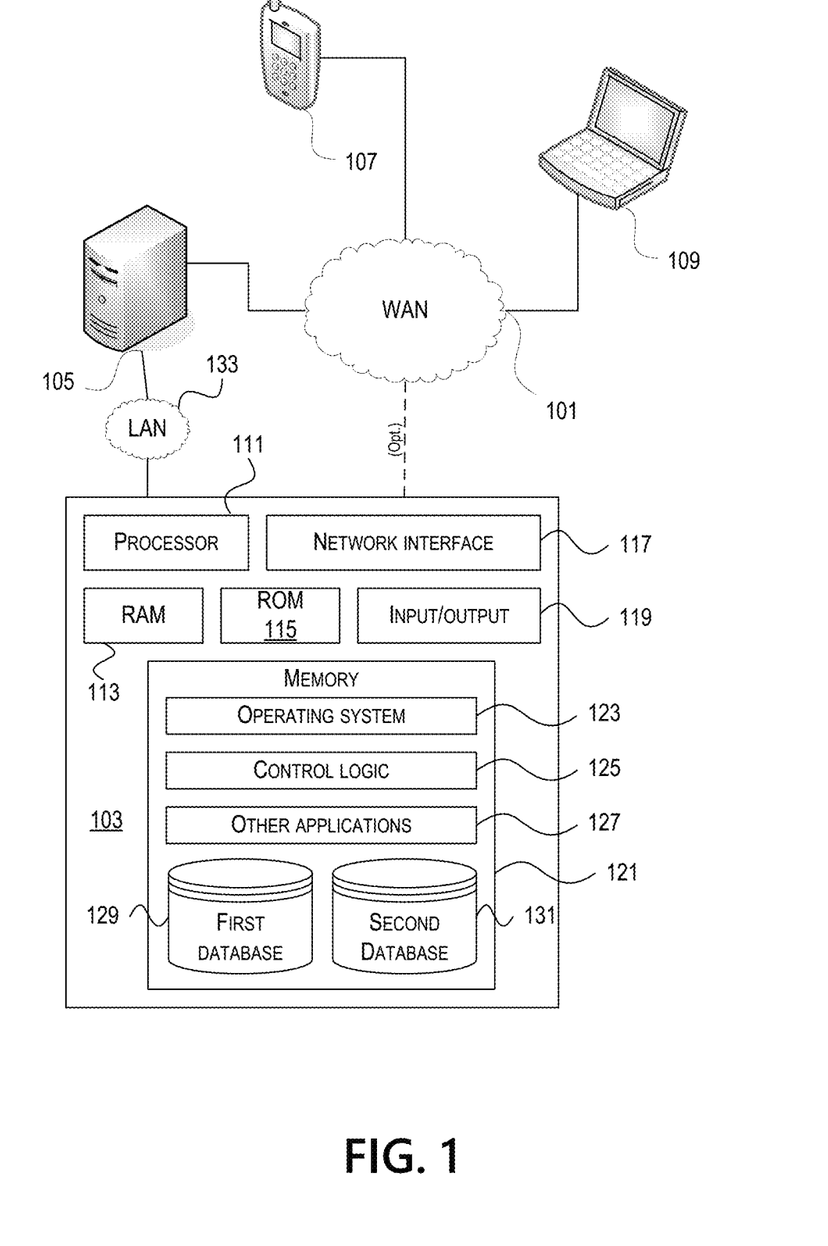
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
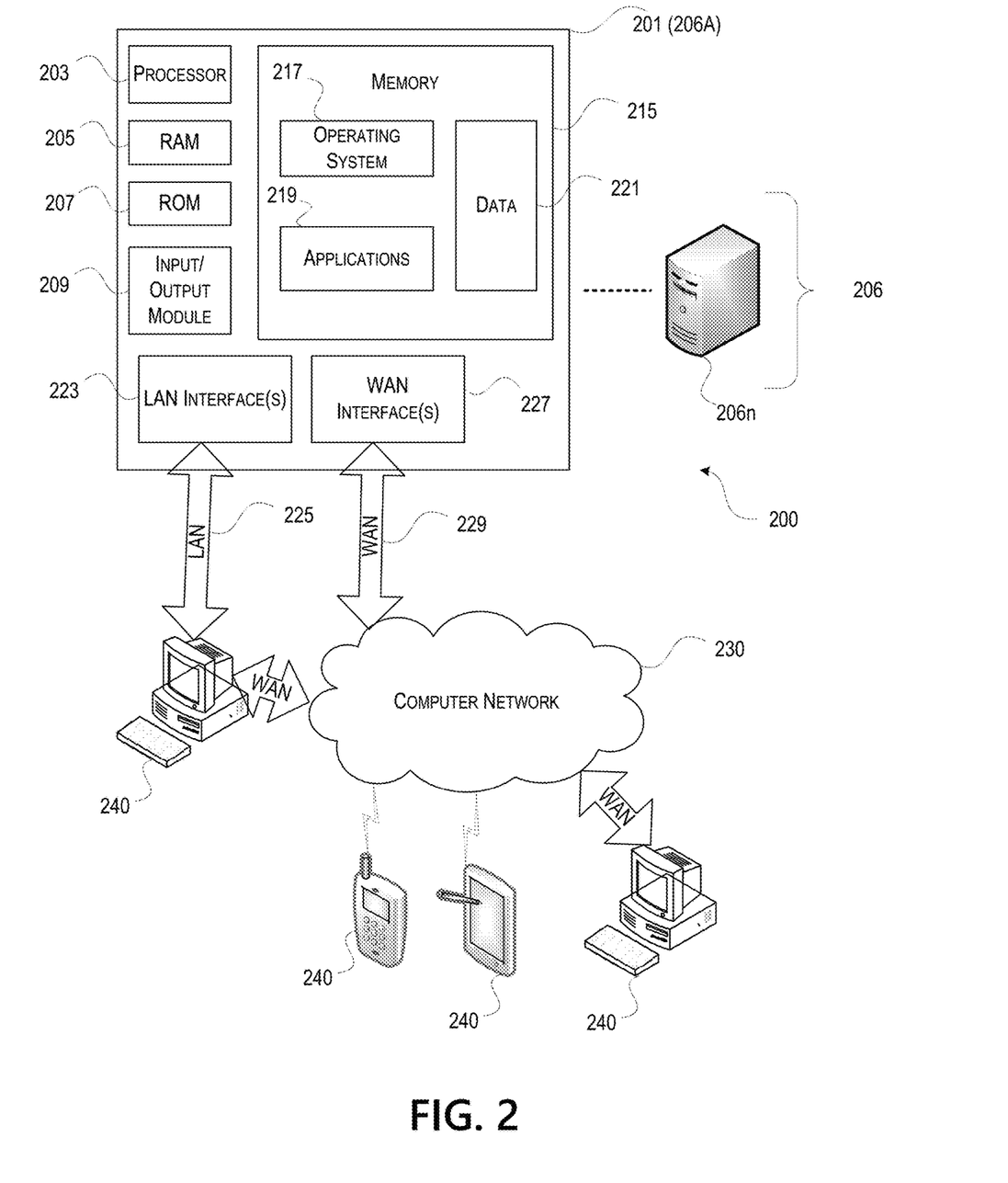
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206*b* (not shown), and responds to the request generated by the client machine 240 with a response from the second server 206*b* (not shown.) First server 206*a* may acquire an enumeration of applications available to the client machine 240 as well as address information associated with an application server 206 hosting an application identified within the enumeration of applications. First server 206*a* can then present a response to the client's request using a web interface, and communicate directly with the client 240 to provide the client 240 with access to an identified application. One or more clients 240 and/or one or more servers 206 may transmit data over network 230, e.g., network 101.

Multi-Application Video Conferencing

Figure 3:
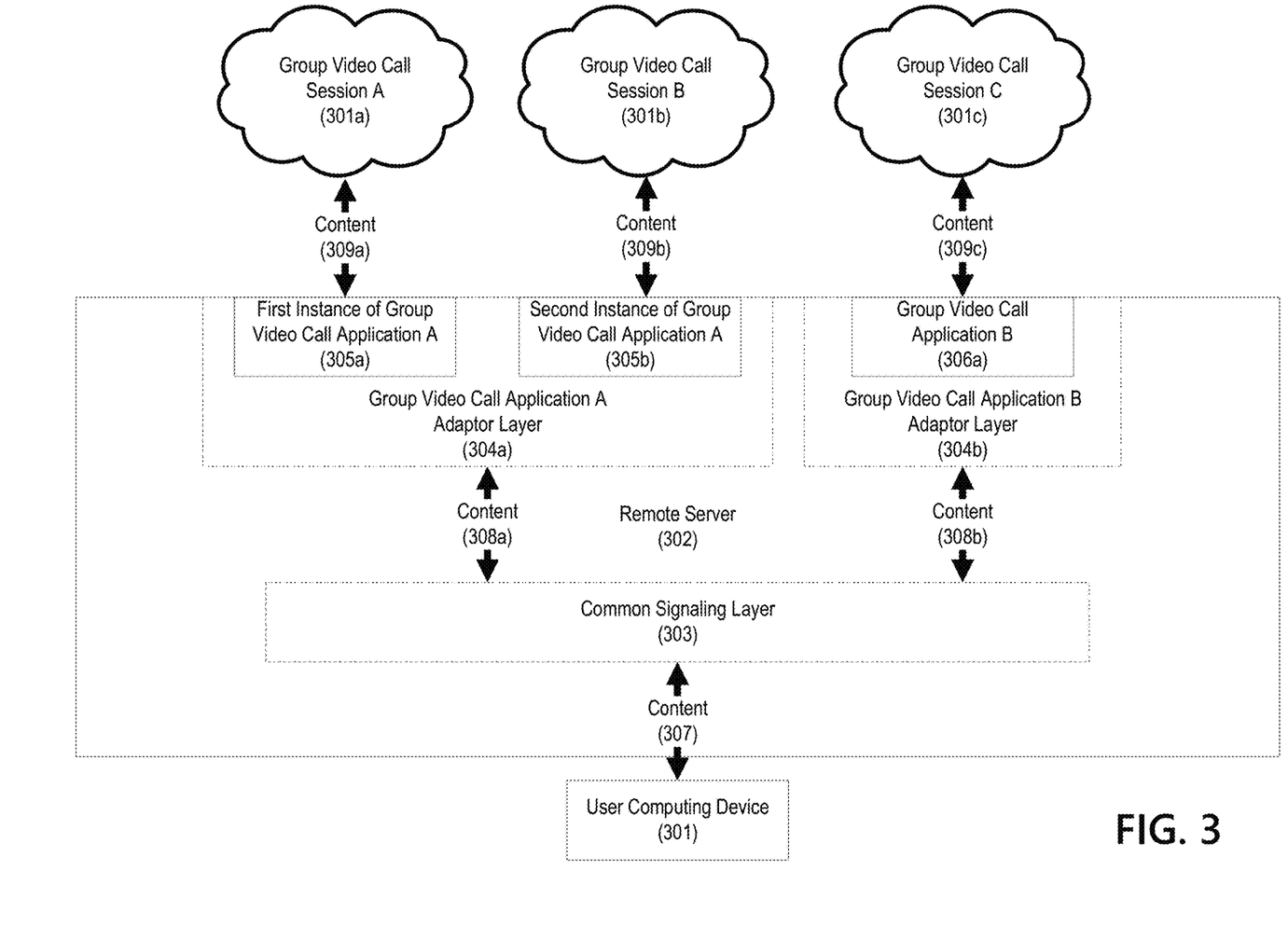
FIG. 3 depicts a system diagram depicting a user computing device participating in a plurality of different group video call sessions via a remote server.
Figure 4:
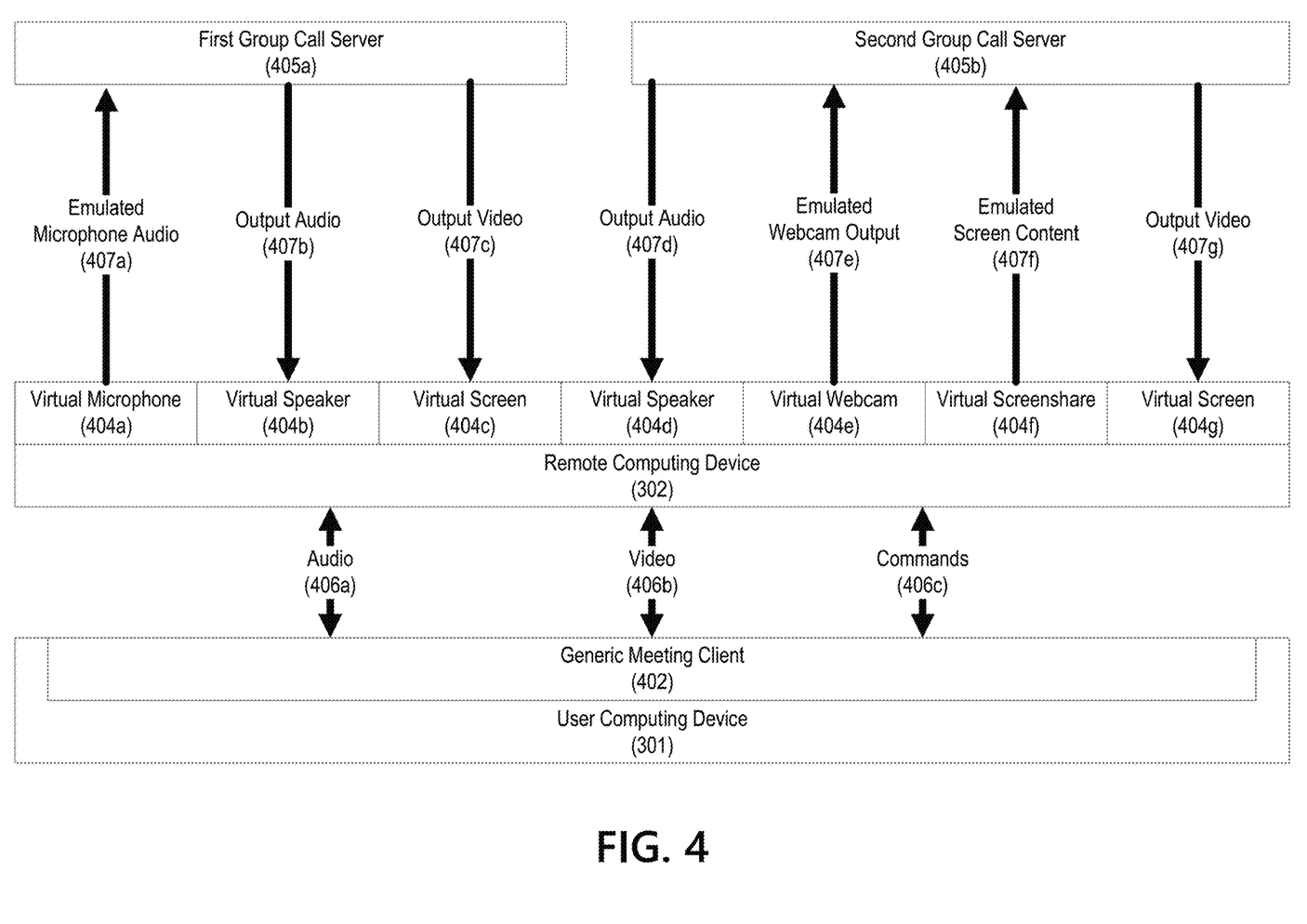
FIG. 4 depicts another system diagram depicting a user computing device participating in a plurality of different group video call sessions via a remote server and using a variety of virtualized devices.

As a preliminary introduction to FIG. 3 and FIG. 4, a remote server may be configures to provide user computing devices access to group video call sessions. As will be detailed further below, the remote server may provide user computing devices access to group video call sessions by receiving content (e.g., commands, video, audio, or the like) from a user computing device, translating that content into one or more formats appropriate for one or more different group video call applications, then providing that translated content to those different group video call applications. In this manner, the user computing device may use a generic meeting client to access (e.g., via the remote server) one or more group video call sessions, regardless of which group video call applications are used as part of those group video call sessions. This approach has multiple advantages: it not only allows users to use a generic meeting client (rather than being forced to install a variety of different group video chat applications) to access a wide variety of group video call sessions, but it may also allow users to participate in multiple group video call sessions at once.

FIG. 3 depicts a system diagram depicting a user computing device participating in a plurality of different group video call sessions via a remote server. A user computing device 301 may send and/or receive content 307 to and/or from a common signaling layer 303 of a remote server 302. Within the remote server 302, the content may be sent, as content 308*a* and content 308*b*, to a group video call application A adaptor layer 304*a* and a group video call application B adaptor layer 304*b*. The group video call application A adaptor layer 304*a* may execute two instances of group video call application A: for instance, as shown in FIG. 3, a first instance of a group video call application A 305*a* and a second instance of a group video call application A 305*b*. The group video call application B adaptor layer 304*b* may execute one or more instances of group video call application B: for instance, as shown in FIG. 3, group video call application B 306*a*. The first instance of a group video call application A 305*a* may send the content, as content 309*a*, to a group video call session A 301*a*. The second instance of a group video call application A 305*b* may send the content, as content 309*b*, to group video call session B 301*b*. The group video call application B 306*a* may send the content, as the content 309*c*, to group video call session C 301*c*.

The user computing device 301 and the remote server 302 may be one or more computing devices, such as any of the computing devices described with respect to FIG. 1 and/or FIG. 2. For example, the user computing device 301 may be a smartphone, laptop computer, desktop computer, or the like. The remote server 302 may be one or more computing devices, such as one or more servers. Though termed remote, the remote server 302 need not be any particular distance from the user computing device 301.

The remote server 302 may transmit and receive content (e.g., the content 307) to and from the user computing device 301. For example, the user computing device 301 may provide video (e.g., webcam video captured from a camera of the user computing device 301, video of a screen and/or one or more applications executing on the user computing device 301, or the like), audio (e.g., microphone audio captured from a microphone of the user computing device 301, sounds captured from an application executing on the user computing device 301, or the like), and/or commands (e.g., indication(s) to invite a user to a group video call session, a command to mute audio in the group video call session, interaction(s) with a text chat associated with the group video call session, or the like). Such content may be received by the common signaling layer 303 of the remote server 302. In this manner, the remote server 302 may receive, via the common signaling layer 303, any sort of content (e.g., the content 307) which may be provided by the user computing device 301. In turn, as also described in the summary above, the remote server 302 may provide, via the common signaling layer 303, content (e.g., the content 307) to the user computing device 301. For example, the remote server 302 may provide, via the common signaling layer 303 and to the user computing device 301, output (e.g., audio and/or video) corresponding to one or more group video call sessions.

The remote server 302 may be configured to translate content received from the user computing device 301 (e.g., the content 307) into a format compatible with one or more group video call applications. One or more group video call sessions (e.g., the group video call session A 301*a*, the group video call session B 301*b*, and/or the group video call session C 301*c*) may correspond to one or more different group video call applications. For example, one group video call session may correspond to a Microsoft Teams call, whereas another group video call session may correspond to a Zoom meeting. As another example, as illustrated in FIG. 3, the group video call session A 301*a* and the group video call session B 301*b* may correspond to group video call application A (executing in two different instances, the first instance of group video call application A 305*a* and the second instance of group video call application A 305*b*), whereas the group video call session C may correspond to group video call application B 306*a*. As such, to translate content received from the user computing device 301 (e.g., the content 307) into a format compatible with one or more group video call applications, the remote server 302 may identify one or more group video call applications which correspond to one or more group video call sessions. Based on the identity of those one or more group video call applications, the remote server 302 may translate content received from the user computing device 301 from a first format (e.g., a format compatible with a generic meeting client) into one or more second formats (e.g., a format compatible with one or more different group video call applications). For example, the compression rate of audio received from the user computing device 301 may be modified, the resolution of a video stream received from a webcam of the user computing device 301 may be modified, or the like.

The remote server 302 may be configured to execute, in one or more adaptor layers, one or more instances of group video call applications. For example, as shown in FIG. 3, the remote server 302 may manage two adaptor layers: the group video call application A adaptor layer 304*a*, and the group video call application B adaptor layer 304*b*. Each of these different adaptor layers may execute any number of instances of group video call applications. The remote server 302 may execute these different instances directly, through one or more virtual desktops, using one or more remote desktops (e.g., by executing different instances of the group video call applications in a cloud computing platform), or the like. The remote server 302 may be configured to provide content, received from the user computing device 301 and translated into one or more different formats, to one or more instances of a group video call application. For example, as shown in FIG. 3, the common signaling layer 303 provides content (as the content 308*a* and the content 308*b*, which may comprise all or portions of the content 307 received from the user computing device 301) to the group video call application A adaptor layer 304*a* and the group video call application B adaptor layer 304*b*. In in this manner, the remote server 302 may provide, to one or more executing instances of a group video call application, content, received from the user computing device 301, that has been translated into a format specific to that group video call application. As shown in FIG. 3, that content may be provided (e.g., as shown by the content 309*a*, the content 309*b*, and the content 309*c*) to one or more group video calls sessions.

FIG. 4 depicts another system diagram depicting the user computing device 301 participating in a plurality of different group video call sessions via the remote server 302 and using a variety of virtualized devices. FIG. 4 differs from FIG. 3 in that it focuses on how different types of content (e.g., different types of the content 307) may be provided to different group video call sessions using virtual devices that translate content received from the user computing device 301 into a format for a particular group video call application (and vice versa). As shown in FIG. 4, the user computing device 301 may execute a generic meeting client 402 that may provide different forms of content to the remote server 302. Specifically, FIG. 4 shows that the generic meeting client 402 executing on the user computing device 301 is providing audio 406*a*, video 406*b*, and commands 406*c* to the remote server 302. Collectively, the audio 406*a*, video 406*b*, and/or the commands 406*c* may be all or portions of the content 307 described with respect to FIG. 3. The remote server 302 is shown as implementing a variety of virtualized devices for different group video call sessions. Specifically, for a first group call server 406*a* (which may, for example, correspond to the group video call session A 301*a*), the remote server 302 provides a virtual microphone 404*a*, a virtual speaker 404*b*, and a virtual screen 404*c*. Moreover, for a second group call server 405*b* (which may, for example, correspond to the group video call session B 301*b*), the remote server 302 provides a virtual speaker 404*d*, a virtual webcam 404*e*, a virtual screenshare 404*f*, and a virtual screen 404*g*. Each of these different virtual devices is shown interacting with group call servers in different ways. The virtual microphone 404*a* may send emulated microphone audio 407*a* to the first group call server 405*a*. The virtual speaker 404*b* may receive output audio 407*b* from the first group call server 405*a*. The virtual screen 404*c* may display output video received from the first group call server 405*a*. The virtual speaker 404*d* may receive output audio 407*d* from the second group call server 405*b*. The virtual webcam 404*e* may send emulated webcam output 407*e* to the second group call server 405*b*. The virtual screenshare 404*f* may send emulated screen content 407*f* to the second group call server 405*b*. The virtual screen 404*g* may receive output video 407*g* from the second group call server 405*b*.

The generic meeting client 402 may be any group video call application. In some cases, the generic meeting client 402 may comprise a preexisting group video call application, such as the Zoom Cloud Meetings application developed by Zoom Video Communications of San Jose, Calif. In this manner, a user might use their group video call application of choice to, using the remote server 302, access any group video call session, regardless of which group video call application(s) are associated with that group video call session. Additionally and/or alternatively, the generic meeting client 402 might be a separate application, such as an application developed for a particular organization. Such an approach might be taken where, for example, the generic meeting client 402 is developed to comply with particular security requirements for an organization.

Virtual microphones, such as the virtual microphone 404*a*, may emulate audio received from the user computing device 301 (e.g., the audio 406*a*). Such audio may be translated from a first format provided by the generic meeting client 402 executing on the user computing device 301 into a second format appropriate for a particular group video call application.

Virtual speakers, such as the virtual speaker 404*b* and/or the virtual speaker 404*d*, may emulate a speaker of a computing device such that output audio received from a group video call session (e.g., and from the first group call server 405*a* and/or the second group call server 405*b*) is received, translated into a format appropriate for the generic meeting client 402 executing on the user computing device 301, and transmitted to the generic meeting client 402 executing on the user computing device 301.

Virtual screens, such as the virtual screen 404*c* and/or the virtual screen 404*g*, may be configured to receive output content from a group video call session (e.g., video from other participants' cameras, text from a text chat, or similar content), translate that output into a format appropriate for the generic meeting client 402 executing on the user computing device 301, and transmit it to the generic meeting client 402 executing on the user computing device 301.

Virtual webcams, such as the virtual webcam 404*e*, may be configured to emulate a webcam of the user computing device 301. In this manner, video and/or audio received from the generic meeting client 402 executing on the user computing device 301 (e.g., the audio 406*a* and/or the video 406*b*) may be translated into a format appropriate for a particular group video call session and provided to a group video call application corresponding to that group video call session.

Virtual screenshares, such as the virtual screenshare 404*f*, may be configured to allow the user computing device 301 to share its screen and/or any portion thereof (e.g., a view of an application executing on the user computing device 301) with a group video call session. For example, the generic meeting client 402 may capture all or portions of a screen of the user computing device 301 and send it (as audio and/or video, such as the audio 406*a* and/or the video 406*b*) to the remote server 302. Then, the remote server 302 may use the virtual screenshare 404*f* to provide the captured all or portions of a screen of the user computing device 301 to a group video call session.

Figure 5:
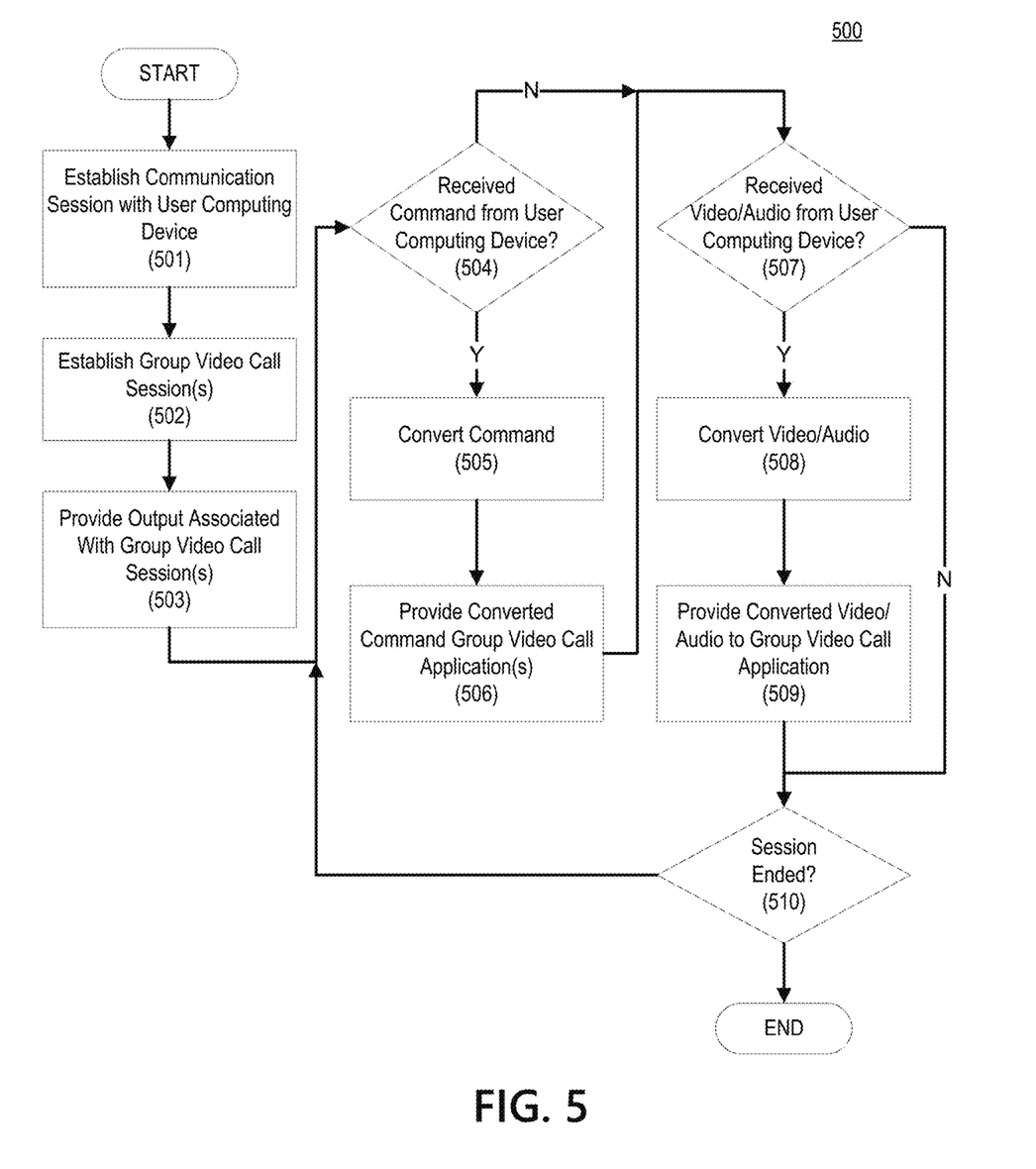
FIG. 5 is a flow chart comprising steps which may be performed by a computing device to provide a user computing device access to one or more group video call sessions.

FIG. 5 is a flow chart 500 comprising steps which may be performed by a computing device to provide a user computing device access to one or more group video call sessions. The steps depicted in FIG. 5 may be performed by a computing device, such as one or more of the computing devices described with respect to FIG. 1, FIG. 2, FIG. 3, and/or FIG. 4. For example, a computing device may comprise one or more processors and memory storing instructions that, when executed by the one or more processors, cause performance of one or more of the steps of FIG. 5. Additionally and/or alternatively, one or more computer-readable media may store instructions that, when executed by one or more processors of a computing device, cause the computing device to perform one or more of the steps of FIG. 5. The steps depicted in FIG. 5 are examples, and may be rearranged as desired. For example, step 504 through step 506 are depicted as occurring before step 507 through step 509, but this order may be reversed (and/or performed in parallel) if desired.

In step 501, a computing device may establish a communication session with a user computing device, such as the user computing device 301. For example, the computing device may establish a first communications session with the user computing device 301. Establishing the communications session may comprise establishing a communications session with the generic meeting client 402 executing on the user computing device 301. In some circumstances, the generic meeting client 402 may be configured to emulate a standard group video call application. In such circumstances, the user need not necessarily know that the application they are using may be (as described in more detail below) processed to connect with various standards of group video call application.

In step 502, the computing device may establish one or more group video call sessions. For example, the computing device may establish, via a group video call application, a group video call session. The one or more group video call sessions may be established at the request of the user by, for example, the user clicking a hyperlink to join a preexisting group video call session, by clicking a button in a calendar application, by requesting a new group video call session be instantiated, or the like. As such, the computing device may establish one or more group video call sessions by creating an entirely new group video call session and/or by joining a preexisting group video call session. Establishing one or more group video call sessions may comprise establishing one or more communications sessions with servers, such as the first group call server 405a and/or the second group call server 405b.

Establishing the one or more group video call sessions may comprise executing one or more group video call applications. As depicted in FIG. 3, a computing device such as the remote server 302 may instantiate various instances of group video call applications as part of establishing (e.g., creating or joining) one or more group video call sessions. Such applications may be executed directly on the computing device, in a virtualized environment (e.g., a virtual machine), or the like. For example, the computing device may execute, in a remote desktop environment, a group video call application. The particular group video call application instantiated for any given group video call session may be based on the way in which the group video call session is requested by a user. For example, a user may, using the user computing device 301, click a hyperlink to access a group video call session. The clicking of that link may cause the performance of step 501. In turn, contents of that hyperlink, such as the domain name associated with the hyperlink, may suggest the group video call application that should be instantiated by the computing device.

Establishing the one or more group video call sessions may comprise authentication of one or more computing devices and/or users. The computing device may be configured to authenticate on behalf of a user. For example, the computing device may receive, from the user computing device 301, authentication credentials, then establish the group video call session by providing, to the group video call application, the authentication credentials. This may be useful where, for example, a group video call session is protected and/or otherwise limited to certain users (e.g., employees of an organization).

Establishing the one or more group video call sessions may comprise emulating one or more aspects of the user computing device. In some instances, group video call sessions and/or group video call applications may require certain operating parameters. For example, some group video call sessions may be limited to users in a particular country, whereas some group video call sessions may allow users to access the session on their smartphone but not their laptop. In turn, the computing device may, as part of step 502, emulate one or more aspects of the user computing device. For example, the computing device may emulate a location of the user computing device 301. As another example, the computing device may emulate one or more operating parameters of the user computing device 301, such as its operating system, screen size, or the like. To effectuate such emulation, the computing device may use one or more virtualization techniques, such as by executing a mobile operating system in an emulator, then executing the appropriate group video call application in the emulated mobile operating system.

In step 503, the computing device may provide output associated with the one or more group video call sessions. The output provided as part of step 503 may be any output that may be provided by a group video call application, such as video and/or audio (e.g., associated with other participants), text (e.g., associated with a text chat), or the like. For example, the computing device may provide, to the user computing device and via the first communications session, video output associated with the group video call session. The user computing device 301 may use this output (via, e.g., the generic meeting client 402) to provide a substantially similar experience to a user as if they were executing the group video call application directly. For example, the generic meeting client 402 may receive the output provided in step 503 and emulate the interface of the group video call application such that, from the user's perspective, the user feels as if they are directly using the group video call application. That said, in some circumstances, it may be desirable for the generic meeting client 402 to receive the output and provide a different interface, particularly in circumstances where a user has expressed preferences about application layout.

As will be discussed in greater detail with respect to FIG. 6A, the computing device may provide output from one or more group video call sessions to multiple user computing devices at once. In such a circumstance, the computing device may be configured to process (e.g., format) the output differently based on particularities of the receiving user device. For example, if a user computing device is a smartphone, the computing device may format the output in a smartphone-friendly manner (e.g., with video in a lower resolution and with user interface elements slightly larger and touch-friendly). As another example, if a user computing device is a desktop, then the computing device may format the output in a desktop-friendly manner (e.g., with relatively smaller user interface elements and with video in a higher resolution).

In step 504, the computing device may determine whether it has received a command from the user computing device. The computing device may receive, from the user computing device and via the first communications session, a command configured to interact with a second group video call application different from the group video call application. For example, the command might be received by a first group video call application executing on the user computing device (e.g., the generic meeting client 402), but it might be intended for a group video call session associated with a different group video call application. That command may relate in any way to a group video call application: it may relate to options in a menu of the group video call application, a command to close the application, a command relating to the membership of the group video call session, or the like. Such a command may be received by a group video call application executing on the user computing device, such as the generic meeting client 402. If the computing device determines that it has received a command from the user computing device 301, the flow chart 500 may proceed to step 505. Otherwise, the flow chart 500 may proceed to step 507.

As indicated above, a command may relate to any aspect of one or more group video call applications. For example, the command may relate to inviting a user to the group video call session, modifying a role of a participant of the group video call session, kicking a user from the group video call session, or the like. As another example, the command may relate to modifying a volume or a presentation quality of the group video call session, such as muting audio in the group video call session, changing a bandwidth cap of the group video call session, changing a bit rate of audio compression in the group video call session, or the like. As yet another example, the command may relate to interacting with a text chat associated with the group video call session, such that the command may comprise text to be shared via the group video call session.

In step 505, the computing device may convert the received command into one or more formats compatible with one or more group video call applications. For example, the computing device might convert the received command from a format complaint with a first group video call application (e.g., the generic meeting client 402) into a format compliant with a second group video call application (e.g., one associated with a particular group video call session). Different group video call applications may expect different forms of commands. For example, two different group video call applications may have different shortcuts for a mute command. As another example, one group video call application may allow a user to kick another user by clicking a button on the right-hand side of their screen, whereas another group video call application may allow a user to kick another user using a particularized keyboard command or through use of a drop-down menu. Additionally and/or alternatively, group video call applications may be programmed to block and/or otherwise limit the ability for computing devices to emulate input (e.g., use simulated microphones or cameras), such that processing steps (e.g., use of the virtual devices illustrated in FIG. 4) may be necessary to obfuscate the fact that the user computing device 301 is not directly executing a particular group video chat application. As such, the same command (e.g., mute, kicking a particular user) may require a different configuration of keystrokes, mouse movement, or some combination thereof to effectuate. In turn, the computing device may determine how a particular command may be translated into a format compatible with one or more group video call applications. For example, the computing device may convert, based on an identity of the group video call application, the command into a format compatible with the group video call application. To perform this step, the computing device may query a database that correlates, for a variety of different group video call applications, the particular mouse movements, keystrokes, and/or actions required to effectuate a particular command.

Converting the command may comprise determining how to emulate the command using one or more mouse movements, keystrokes, or other similar forms of input. Some group video call applications may allow a user to initiate certain commands (e.g., kicking another user) based on mouse input, whereas other group video call applications may allow a user to initiate certain commands (e.g., adjusting a volume of the group video call session) using one or more keystrokes. In turn, the computing device may determine how to emulate those mouse movements, keystrokes, and/or other similar forms of input. For example, the computing device may determine one or more mouse movements corresponding to the command. As a more particular example, for a particular group video call application, the computing device may determine that, to kick a user, a mouse cursor must be moved to hover over the name of the particular user, the right mouse button must be clicked, and a kick option must be selected from a drop-down list of options.

In step 506, the computing device may provide the converted command to one or more group video call applications. For example, the computing device may provide, to the group video call application, the converted command. In the circumstance where the converted command entails one or more mouse movements, keystrokes, and/or other actions, providing the converted command may comprise emulating the one or more mouse movements, keystrokes, and or other actions.

In step 507, the computing device may determine whether it has received video and/or audio from the user computing device. The computing device may receive video data via, for example, a camera of the user computing device 301, a screen of the user computing device 301 (e.g., in the case of screen and/or application capture), or the like. Additionally and/or alternatively, the computing device may receive audio data via, for example, one or more microphones of the user computing device 301 and/or one or more applications executing on the user computing device 301 (e.g., in the case of screen and/or application capture). If the computing device determines that it has received video and/or audio from the user computing device, the flow chart 500 may proceed to step 508. Otherwise, the flow chart 500 may proceed to step 510.

In step 508, the computing device may convert the received video and/or audio into one or more formats compatible with one or more group video call applications. Different group video call applications may expect audio and/or video in a different format. For example, one group video call application may expect audio and/or video at a first bitrate, whereas a different group video call application may expect audio and/or video at a second bitrate. In turn, the computing device may convert the received video and/or audio into a format compatible with the one or more group video call applications associated with one or more group video call sessions. For example, the computing device may convert, based on the identity, the video data into a format compliant with the group video call application.

In step 509, the computing device may provide the converted video and/or audio to one or more group video call applications. For example, the computing device may provide, to the group video call application, the converted video data. Providing the converted video and/or audio to the one or more group video call applications may comprise use of virtualized devices, such as those described with respect to FIG. 4. In that manner, the computing device may emulate the circumstance where the one or more group video call applications are directly provided the video and/or audio from the user computing device 301.

In step 510, the computing device may determine whether one or more group video call sessions have ended. The process depicted in step 504 through step 509 may loop as desired while the user computing device 301 accesses one or more group video call sessions via the computing device. As such, if one or more group video call sessions have ended, the flow chart 500 may end. Otherwise, the flow chart 500 may return to step 504.

The process described in FIG. 5 may be repeated, as desired, for multiple different user computing devices and/or multiple different group video call sessions. In other words, the process depicted in FIG. 5 may connect multiple different users to the same group video call session, connect the same user to a plurality of different group video call sessions, or some combination thereof. For example, the computing device may provide, to a second user computing device (e.g., one associated with a different user as compared to the user computing device 301), second video output associated with the group video call session. That group video call session may be the same or similar as the one discussed with respect to the steps described in FIG. 5, such that the user computing device 301 and the second user computing device may be connected to the same group video call session. The computing device may then receive, from the second user computing device, a second command configured to interact with a third group video call application different from the group video call application. The command may be the same or similar as those described with respect to step 504 through step 506. The computing device may then convert, based on an identity of the group video call application, the second command into a format compatible with the group video call application. This process may be the same or similar as step 505, described above, albeit with respect to a second user computing device. The computing device may then provide, to the group video call application, the converted second command. That step may be the same or similar as step 506 of FIG. 5, described above, albeit with respect to a second user computing device.

Figure 6A:
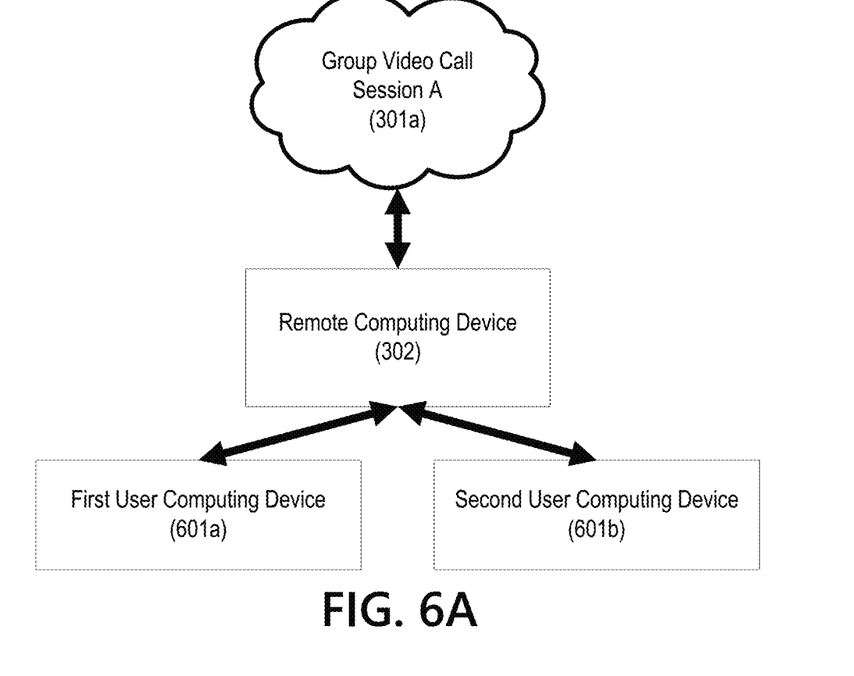
FIG. 6A is a system diagram showing two different user computing devices connected, via a remote computing device, to a group video call session.

FIG. 6A is a system diagram showing two different user computing devices—a first user computing device 601a and a second user computing device 601b—connected, via the remote server 302, to a group video call session (e.g., the group video call session A 301a). The first user computing device 601a and the second user computing device 601b depicted in FIG. 6A may be the same or similar as the user computing device 301 of FIG. 3. In this manner, FIG. 6A illustrates that the remote server 302 may be used by different user computing devices to access the same group video call session. Indeed, the different user computing devices need not execute the same or a similar application: for example, while the first user computing device 601a may execute the generic meeting client 402 described with respect to FIG. 4, the second user computing device 601b may execute an entirely different group video call application, and yet both may use the process described herein to access the same group video call session via the remote server 302. For instance, where the remote server 302 provides different computing devices access to the same group video call session, it may be configured to format the output of that session differently for the different user computing devices. For example, the remote server 302 may provide a higher resolution output video stream to the first user computing device 601a as compared to the second user computing device 601b based on determining that the first user computing device 601a is a desktop and the second user computing device 601b is a smartphone.

Figure 6B:
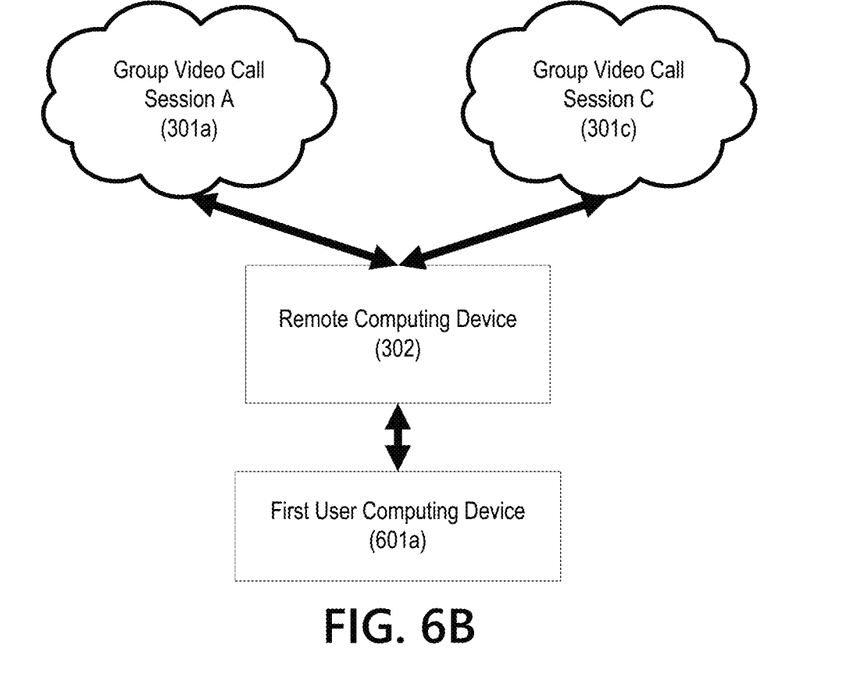
FIG. 6B is a system diagram showing a user computing device connected, via a remote computing device, to two different group video call sessions.

FIG. 6B is a system diagram showing the first user computing device 601a connected, via the remote server 302, to two different group video call sessions—here, the group video call session A 301a and the group video call session C 301c. One advantage of the aspects described herein is that the same user may use the remote server 302 to connect to two different group video call sessions simultaneously, in effect bridging the two. In this manner, for example, a presenter may provide the same video and/or audio to two different group video call sessions. To effectuate this process, the remote server 302 may send all video and/or audio received from the first user computing device 601a to both group video call sessions, but may permit the user to specify (e.g., in a user interface of the generic meeting client 402) one or more group video call sessions that a particular command (e.g., mute, kick user) is intended for.

The following paragraphs (M1) through (M9) describe examples of methods that may be implemented in accordance with the present disclosure.

(M1) A method comprising: establishing, by a computing device, a first communications session with a user computing device; establishing, via a group video call application, a group video call session; providing, to the user computing device and via the first communications session, video output associated with the group video call session; receiving, from the user computing device and via the first communications session, a command configured to interact with a second group video call application different from the group video call application; converting, based on an identity of the group video call application, the command into a format compatible with the group video call application; and providing, to the group video call application, the converted command.

(M2) A method may be performed as described in paragraph (M1) wherein the command configured to interact with the second group video call application different from the group video call application corresponds to one or more of: inviting a user to the group video call session; muting audio in the group video call session; or interacting with a text chat associated with the group video call session.

(M3) A method may be performed as described in any of paragraphs (M1) through (M2) further comprising: receiving, via a camera of the user computing device, video data; converting, based on the identity, the video data into a format compliant with the group video call application; and providing, to the group video call application, the converted video data.

(M4) A method may be performed as described in any of paragraphs (M1) through (M3) wherein converting the command comprises: determining one or more mouse movements corresponding to the command, wherein providing the converted command comprises emulating the one or more mouse movements.

(M5) A method may be performed as described in any of paragraphs (M1) through (M4) wherein establishing the group video call session comprises: executing, in a remote desktop environment, the group video call application.

(M6) A method may be performed as described in any of paragraphs (M1) through (M5) further comprising: providing, to a second user computing device, second video output associated with the group video call session; receiving, from the second user computing device, a second command configured to interact with a third group video call application different from the group video call application; determining a second identity of a different group video call application associated with the group video call session; converting, based on the second identity, the second command into a second format compatible with the different group video call application; and providing, to the different group video call application, the converted second command.

(M7) A method may be performed as described in any of paragraphs (M1) through (M6) wherein establishing the group video call session comprises: receiving, from the user computing device, authentication credentials; and establishing the group video call session by providing, to the group video call application, the authentication credentials.

(M8) A method may be performed as described in any of paragraphs (M1) through (M7) wherein establishing the group video call session comprises: emulating a location of the user computing device.

(M9) A method may be performed as described in any of paragraphs (M1) through (M8) wherein receiving the command corresponding to the group video call session is via a second group video call application executing on the user computing device.

The following paragraphs (A1) through (A9) describe examples of apparatuses that may be implemented in accordance with the present disclosure.

(A1) A computing device comprising: one or more processors; and memory storing instructions that, when executed by the one or more processors, cause the computing device to: establish a first communications session with a user computing device; establish, via a group video call application, a group video call session; provide, to the user computing device and via the first communications session, video output associated with the group video call session; receive, from the user computing device and via the first communications session, a command configured to interact with a second group video call application different from the group video call application; convert, based on an identity of the group video call application, the command into a format compatible with the group video call application; and provide, to the group video call application, the converted command.

(A2) An apparatus as described in paragraph (A1), wherein the command configured to interact with the second group video call application different from the group video call application corresponds to one or more of: inviting a user to the group video call session; muting audio in the group video call session; or interacting with a text chat associated with the group video call session.

(A3) An apparatus as described in any one of paragraphs (A1) through (A2), wherein the instructions, when executed by the one or more processors, further cause the computing device to: receive, via a camera of the user computing device, video data; convert, based on the identity, the video data into a format compliant with the group video call application; and provide, to the group video call application, the converted video data.

(A4) An apparatus as described in any one of paragraphs (A1) through (A3), wherein the instructions, when executed by the one or more processors, cause the computing device to convert the command by causing the computing device to: determine one or more mouse movements corresponding to the command, wherein the instructions, when executed by the one or more processors, cause the computing device to provide the converted command by emulating the one or more mouse movements.

(A5) An apparatus as described in any one of paragraphs (A1) through (A4), wherein the instructions, when executed by the one or more processors, cause the computing device to establish the group video call session by causing the computing device to: execute, in a remote desktop environment, the group video call application.

(A6) An apparatus as described in any one of paragraphs (A1) through (A5), wherein the instructions, when executed by the one or more processors, further cause the computing device to: provide, to a second user computing device, second video output associated with the group video call session; receive, from the second user computing device, a second command configured to interact with a third group video call application different from the group video call application; determine a second identity of a different group video call application associated with the group video call session; convert, based on the second identity, the second command into a second format compatible with the different group video call application; and provide, to the different group video call application, the converted second command.

(A7) An apparatus as described in any one of paragraphs (A1) through (A6), wherein the instructions, when executed by the one or more processors, further cause the computing device to establish the group video call session by causing the computing device to: receive, from the user computing device, authentication credentials; and establish the group video call session by providing, to the group video call application, the authentication credentials.

(A8) An apparatus as described in any one of paragraphs (A1) through (A7), wherein the instructions, when executed by the one or more processors, further cause the computing device to establish the group video call session by causing the computing device to: emulate a location of the user computing device.

(A9) An apparatus as described in any one of paragraphs (A1) through (A8), wherein the instructions, when executed by the one or more processors, cause the computing device to receive the command corresponding to the group video call session via a second group video call application executing on the user computing device.

The following paragraphs (CRM1) through (CRM9) describe examples of computer-readable media that may be implemented in accordance with the present disclosure.

(CRM1) A non-transitory computer-readable medium storing instructions that, when executed by one or more processors of a computing device, cause the computing device to establish a first communications session with a user computing device; establish, via a group video call application, a group video call session; provide, to the user computing device and via the first communications session, video output associated with the group video call session; receive, from the user computing device and via the first communications session, a command configured to interact with a second group video call application different from the group video call application; convert, based on an identity of the group video call application, the command into a format compatible with the group video call application; and provide, to the group video call application, the converted command.

(CRM2) A non-transitory computer-readable medium storing as described in paragraph (CRM1), wherein the command configured to interact with the second group video call application different from the group video call application corresponds to one or more of: inviting a user to the group video call session; muting audio in the group video call session; or interacting with a text chat associated with the group video call session.

(CRM3) A non-transitory computer-readable medium storing as described in any one of paragraphs (CRM1) through (CRM2), wherein the instructions, when executed by the one or more processors, further cause the computing device to: receive, via a camera of the user computing device, video data; convert, based on the identity, the video data into a format compliant with the group video call application; and provide, to the group video call application, the converted video data.

(CRM4) A non-transitory computer-readable medium storing as described in any one of paragraphs (CRM1) through (CRM3), wherein the instructions, when executed by the one or more processors, cause the computing device to convert the command by causing the computing device to: determine one or more mouse movements corresponding to the command, wherein the instructions, when executed by the one or more processors, cause the computing device to provide the converted command by emulating the one or more mouse movements.

(CRM5) A non-transitory computer-readable medium storing as described in any one of paragraphs (CRM1) through (CRM4), wherein the instructions, when executed by the one or more processors, cause the computing device to establish the group video call session by causing the computing device to: execute, in a remote desktop environment, the group video call application.

(CRM6) A non-transitory computer-readable medium storing as described in any one of paragraphs (CRM1) through (CRM5), wherein the instructions, when executed by the one or more processors, further cause the computing device to: provide, to a second user computing device, second video output associated with the group video call session; receive, from the second user computing device, a second command configured to interact with a third group video call application different from the group video call application; determine a second identity of a different group video call application associated with the group video call session; convert, based on the second identity, the second command into a second format compatible with the different group video call application; and provide, to the different group video call application, the converted second command.

(CRM7) A non-transitory computer-readable medium storing as described in any one of paragraphs (CRM1) through (CRM6), wherein the instructions, when executed by the one or more processors, further cause the computing device to establish the group video call session by causing the computing device to: receive, from the user computing device, authentication credentials; and establish the group video call session by providing, to the group video call application, the authentication credentials.

(CRM8) A non-transitory computer-readable medium storing as described in any one of paragraphs (CRM1) through (CRM7), wherein the instructions, when executed by the one or more processors, further cause the computing device to establish the group video call session by causing the computing device to: emulate a location of the user computing device.

(CRM9) A non-transitory computer-readable medium storing as described in any one of paragraphs (CRM1) through (CRM8), wherein the instructions, when executed by the one or more processors, cause the computing device to receive the command corresponding to the group video call session via a second group video call application executing on the user computing device.

Although the subject matter has been described in language specific to structural features and/or methodological acts, it is to be understood that the subject matter defined in the appended claims is not necessarily limited to the specific features or acts described above.

Rather, the specific features and acts described above are described as example implementations of the following claims.

What is claimed is:

1. A computing device comprising:
one or more processors; and
memory storing instructions that, when executed by the one or more processors, cause the computing device to:
establish a first communications session with a user computing device;
establish, via a first group video call application, a group video call session;
provide, to the user computing device and via the first communications session, video output associated with the group video call session;
receive, from the user computing device and via the first communications session, a command configured to interact with a second group video call application;
convert, based on an identity of the first group video call application, the command into a format compatible with the first group video call application; and
provide, to the first group video call application, the converted command:,
wherein the first group video call application is a different type of group video call application from the second group video call application, and the first group video call application requires received commands and video input to be in a different format than the second group video call application.

2. The computing device of claim 1, wherein the command configured to interact with the second group video call application different from the first group video call application corresponds to one or more of:
inviting a user to the group video call session;
muting audio in the group video call session; or
interacting with a text chat associated with the group video call session.

3. The computing device of claim 1, wherein the instructions, when executed by the one or more processors, further cause the computing device to:
receive, via a camera of the user computing device, video data;
convert, based on the identity of the first group video call application, the video data into a video format compliant with the first group video call application; and
provide, to the first group video call application, the converted video data.

4. The computing device of claim 1, wherein the instructions, when executed by the one or more processors, cause the computing device to convert the command by causing the computing device to:
determine one or more mouse movements corresponding to the command, wherein the instructions, when executed by the one or more processors, cause the computing device to provide the converted command by emulating the one or more mouse movements.

5. The computing device of claim 1, wherein the instructions, when executed by the one or more processors, cause the computing device to establish the group video call session by causing the computing device to:

execute, in a remote desktop environment, the first group video call application.

6. The computing device of claim 1, wherein the instructions, when executed by the one or more processors, further cause the computing device to:
provide, to a second user computing device, second video output associated with the group video call session;
receive, from the second user computing device, a second command configured to interact with a third group video call application different from the first group video call application;
convert, based on the identity of the first group video call application, the second command into the format compatible with the first group video call application; and
provide, to the first group video call application, the converted second command.

7. The computing device of claim 1, wherein the instructions, when executed by the one or more processors, further cause the computing device to establish the group video call session by causing the computing device to:
receive, from the user computing device, authentication credentials; and
establish the group video call session by providing, to the first group video call application, the authentication credentials.

8. The computing device of claim 1, wherein the instructions, when executed by the one or more processors, further cause the computing device to establish the group video call session by causing the computing device to:
emulate a location of the user computing device.

9. The computing device of claim 1, wherein the instructions, when executed by the one or more processors, cause the computing device to receive the command corresponding to the group video call session via the second group video call application executing on the user computing device.

10. A method comprising:
establishing, by a computing device, a first communications session with a user computing device;
establishing, via a first group video call application, a group video call session;
providing, to the user computing device and via the first communications session, video output associated with the group video call session;
receiving, from the user computing device and via the first communications session, a command configured to interact with a second group video call application;
converting, based on an identity of the first group video call application, the command into a format compatible with the first group video call application; and
providing, to the first group video call application, the converted command;
wherein the first group video call application is a different type of group video call application from the second group video call application, and the first group video call application requires received commands and video input to be in a different format than the second group video call application.

11. The method of claim 10, wherein the command configured to interact with the second group video call application corresponds to one or more of:
inviting a user to the group video call session;
muting audio in the group video call session; or
interacting with a text chat associated with the group video call session.

12. The method of claim 10, further comprising:
receiving, via a camera of the user computing device, video data;
converting, based on the identity of the first group video call application, the video data into a video format compliant with the first group video call application; and
providing, to the first group video call application, the converted video data.

13. The method of claim 10, wherein converting the command comprises:
determining one or more mouse movements corresponding to the command, wherein providing the converted command comprises emulating the one or more mouse movements.

14. The method of claim 10, wherein establishing the group video call session comprises:
executing, in a remote desktop environment, the first group video call application.

15. The method of claim 10, further comprising:
providing, to a second user computing device, second video output associated with the group video call session;
receiving, from the second user computing device, a second command configured to interact with a third group video call application different from the first group video call application;
converting, based on the identity of the first group video call application, the second command into the format compatible with the first group video call application; and
providing, to the first group video call application, the converted second command.

16. The method of claim 10, wherein establishing the group video call session comprises:
receiving, from the user computing device, authentication credentials; and
establishing the group video call session by providing, to the first group video call application, the authentication credentials.

17. The method of claim 10, wherein establishing the group video call session comprises:
emulating a location of the user computing device.

18. The method of claim 10, wherein receiving the command corresponding to the group video call session is via the second group video call application executing on the user computing device.

19. A computing device comprising:
one or more processors; and
memory storing instructions that, when executed by the one or more processors, cause the computing device to:
establish a first communications session with a user computing device;
establish, via a group video call application, a group video call session with one or more second computing devices;
receive, via a camera of the user computing device, video data;
provide, to the group video call application, the video data;
provide, to the user computing device and via the first communications session, video output associated with the group video call session, wherein the video output is configured for display in a second group video call application executing on the user computing device;
receive, from the second group video call application executing on the user computing device and via the first communications session, a command configured to interact with the second group video call application different from the group video call application;

convert, based on comparing the group video call application with the second group video call application, the command from a first format compatible with the second group video call application into a second format compatible with the group video call application; and provide, to the group video call application, the converted command.

20. The computing device of claim 19, wherein the command configured to interact with the second group video call application different from the group video call application corresponds to one or more of:

inviting a user to the group video call session; muting audio in the group video call session; or interacting with a text chat associated with the group video call session.

\* \* \* \* \*